United States Patent [19]
Sparr, Sr.

[11] 3,828,776
[45] Aug. 13, 1974

[54] TEAT DISINFECTING CUP FOR USE AFTER MILKING
[76] Inventor: Anders V. Sparr, Sr., Rt. 1, Box 272 Milligan Rd., Waupun, Wis. 53963
[22] Filed: Apr. 9, 1973
[21] Appl. No.: 350,132

Related U.S. Application Data
[63] Continuation-in-part of Ser. No. 233,111, March 9, 1972, abandoned.

[52] U.S. Cl............... 128/248, 119/1, 119/158
[51] Int. Cl............................................ A61m 7/00
[58] Field of Search ............ 128/248, 249, 260, 66; 119/1, 158

[56] References Cited
UNITED STATES PATENTS
| 143,627 | 10/1873 | Huntington | 128/249 |
| 1,236,597 | 8/1917 | Nussbaum | 128/249 |
| 1,603,727 | 10/1926 | Vilas | 128/249 |
| 2,350,183 | 5/1944 | Newell | 128/248 |
| 2,523,478 | 9/1950 | Newell | 128/248 |
| 3,713,423 | 1/1973 | Sparr | 128/248 |

FOREIGN PATENTS OR APPLICATIONS
| 10,377 | 4/1889 | Great Britain | 128/249 |

Primary Examiner—Richard A. Gaudet
Assistant Examiner—J. Yasko
Attorney, Agent, or Firm—Clarence A. O'Brien; Harvey B. Jacobson

[57] ABSTRACT

A manually applicable and removable teat disinfecting device expressly adapted for use after milking a cow comprising a hollow cylindrical handle closed at one end and open at its opposite end and provided with an integral coordinating teat dipping cup. One side wall of the cup is provided with a restricted but suitable inlet-outlet opening registering with the open end of the handle. The hollow portion of the handle provides a reservoir in which the antisepticizing solution is stored and from which it is poured by tilting and angling the handle. The upper open mouth of the cup is provided with an endless overhanging flange which constitutes an anti-splashing and protecting guard for the user. The device is self-standing when set aside and not in use and the cup is equipped with an optionally usable hanger hook which can be releasably hooked over the user's belt for out-of-use convenience.

2 Claims, 4 Drawing Figures

PATENTED AUG 13 1974　　3,828,776

TEAT DISINFECTING CUP FOR USE AFTER MILKING

This application is a continuation-in-part of my co-pending application Ser. No. 233,111, filed Mar. 9, 1972 and now abandoned.

This invention relates to appliances and devices which lend themselves to use by persons who are called upon to cope with cow milking machines, washing of teats before and after milking, and sanitation conditions involving ever prevailing mastitis and inflammation difficulties and pertains, more particularly to an improved manually applicable handle-equipped teat dipping and disinfecting device.

More specifically, the concept has to do with a one-piece plastic appliance which, generally stated, is characterized by an applicating dip cup containing an antisepticizing solution, said cup being provided on one side with a hollow handle which functions as a solution containing and dispensing reservoir and which when properly handled permits the user to tilt the device and pour a prescribed amount of the solution into the receptacle portion of the cup for teat dipping and sanitizing needs.

In order to effectually destroy harmful bacteria it is the prevailing practice to utilize iodine-based medication which, when spilled on the hands of the operator results in discolored fingers and hands and, being like a dye, is not only objectionable but is almost impossible to wash off. Then, too, experience has repeatedly shown that if the treated teat has an open sore or wound a sharp and stinging pain causes the cow to kick and it is almost invariably true that the activated foot of the cow will strike the solution containing cup and will result in uncontrollable difficulties. It follows that an object of the invention, broadly construed, is to so construct and utilize the appliance that the user is enabled to better cope with the problem of individually handling the cows of a large and difficult-to-cope-with herd.

Many and structurally and functionally varying handle-equipped cups and receptacle-type applicators have been offered by others working in the field of endeavor under consideration but for one reason or another have not, or so it would seem, met with widespread adoption and use.

In carrying out the principles of the present innovation a simple and practical one-piece plastic unit functions to provide a dual purpose rigid and conveniently manipulatable handle the forward open end of which is provided with an apertured cup, that is, a cup which provides not only a receptacle for the teat dipping solution but is equipped with an overhanging guard flange which, when the cup is in use, minimizes the likelihood of harmful spillage of the disinfecting solution.

Briefly the appliance features a vertically elongated upwardly opening teat enclosing and dipping cup the receptacle portion of which lends itself to telescoping reception of the selected teat. A median portion of one side wall of the cup, that is, the portion between upper and lower ends of the cup, is provided with a triangular or an equivalent inlet and outlet opening. A hollow horizontally elongated solution containing and dispensing handle is disposed at right angles to the apertured wall of the cup and has a closed outer end and an open inner end which is integrally united with the apertured side wall of the cup and is aligned and communicates with the receptacle portion by way of the inlet-outlet opening. The handle has the additional and important function of a reservoir in which the liquid or solution is initially contained when the device is not being used and which also functions as a dispensing and pouring reservoir to achieve the desired antisepticizing needs and permits shifting of the solution from the reservoir into the cup and from the cup back into the reservoir in keeping with the requirements of the user or operator.

Experimental use has shown that the invention when constructed in accordance with the disclosure is virtually spill-proof. The cup tapers, has a flat bottom, an open mouth surrounded by an overhanging curvate guard flange and has a properly centered opening which affords communication between the receptacle portion and storage portion of the handling reservoir. The handle may be rigid and one end is preferably flat. The bottom half portion of the handle is flush with the flat bottom of the cup to thus provide a substantially self-standing appliance when it is not being used. In addition a hanger hook is provided on one side of the cup and can be hooked onto the belt or in one's pocket. Accordingly one can readily appreciate the time and labor saving features of the herein disclosed invention. Better still one can visualize a farmer starting to milk one hundred cows in a stanchion barn keeping in mind that this dipping and sanitizing step must necessarily occur immediately after the milker is taken off the cow. Also keeping in mind that the farmer must walk a few steps, bend over and pick up the dispenser, bend down and dip the cow's teats and bend down and set the appliance down on a support surface. Considering these and the many other time and labor consuming steps involved one can appreciate the difficulties attended when the operator has to set the dispenser down and pick it up for every cow. With this device the operator bends down once, takes the milker off and dips the teats in one operation. Then, too, it is authoritatively contended that a high percentage of mastitis infection can be stopped by acceptable iodine dipping procedures.

For further background information, if needed, reference may be made to U.S. Pat. No. 2,818,068 granted to DeFelice. Further reference may be made to U.S. Pat. No. 3,648,696 granted to Keith and in addition, if so desired, to U.S. Pat. No. 2,350,183 granted to Newell.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 4:
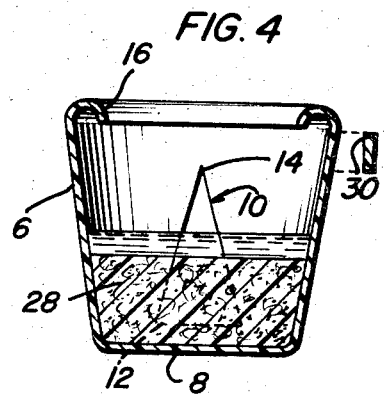
FIG. 4 is a section taken on the vertical section line 4—4 of FIG. 3.
Figure 3:
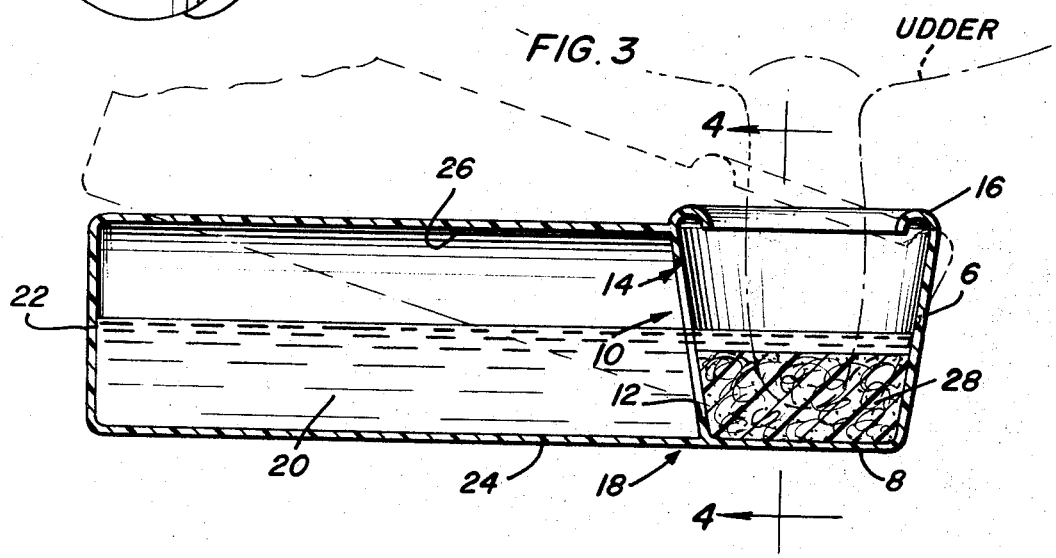
FIG. 3 is a longitudinal section taken approximately on a plane of the section line 3—3 of FIG. 2 looking in the direction of the indicating arrows.

The vertically elongated upwardly opening teat enclosing and dipping cup is denoted by the numeral 6 and, in practice, is preferably tapered downwardly to and is united with a disc-like flat bottom 8. An intermediate portion of one side wall of the cup is provided with the aforementioned solution or liquid inlet and outlet opening 10 whose configuration is preferably triangulate as shown in FIG. 4. The basal portion is denoted at 12 and is parallel with and spaced above the level or plane of the flat bottom 8. The apical upper end portion is denoted at 14 and is spaced downwardly from the upper open mouth. The mouth portion is encompassed or surrounded by an overhanging flange 16 which is preferably concave-convex and which is flush with the upper end of the cup and which is proportional and provides an endless spill resisting guard. The relatively long companion member is denoted by the numeral 18 and is of rigid plastic material and provides a handle and also a reservoir for the antisepticizing solution 20 as denoted in FIG. 3. The hollow portion constitutes a satisfactory reservoir for the solution. The left hand end portion 22 is flat and may be of sufficient diameter that it could be self-standing when for example the handle is in an upright position and seated on a relatively flat support surface (not detailed). The lower half portion (FIG. 3) is denoted by the numeral 24 and is in a common plane with the flat bottom as shown in FIG. 3. The top half portion 26 is in a plane just below the crest of the guard flange 16 as more clearly evident in FIG. 3. By having the surfaces 8 and 24 in a common plane it will be seen that the device is also self-standing when placed horizontally on a flat support surface. It may be desirable in actual practice to provide an absorbent sponge 28 which is lodged in the tapering lower portion of the receptacle of the cup.

It will be evident too that the size of the communicating or circulating opening 10 is proportional to the cross-sectional dimension of the handle, the handle being larger and encompassing the opening in the manner illustrated particularly well in FIG. 4.

Figure 1:
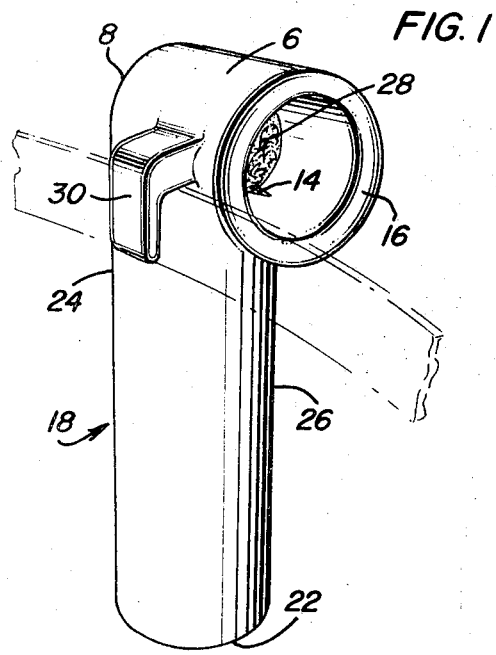
FIG. 1 is a view in perspective of a teat disinfecting device, for use after milking a cow, constructed in accordance with the present invention and showing the same out of use, that is, with the hanger hook hitched onto the operator's belt.
Figure 2:
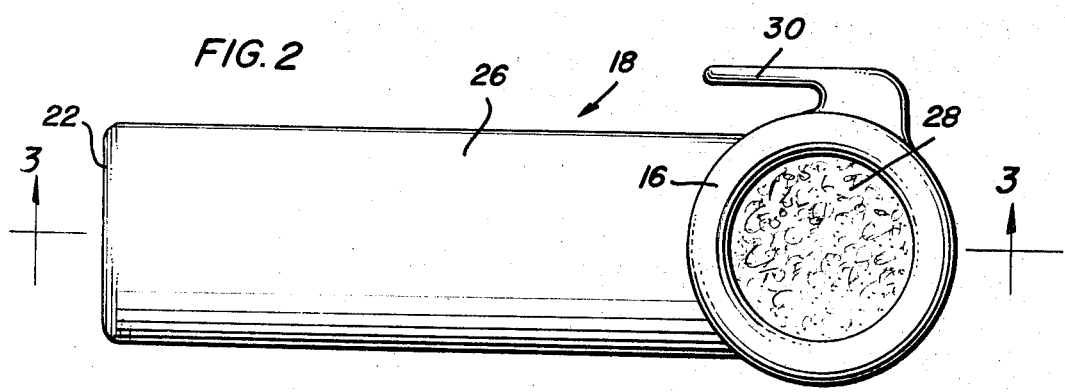
FIG. 2 is what may be described as a top plan view of the device readied for use.

It is also desirous in actual practice to provide an integral suitably positioned hook 30 which is of the shape, size and locale illustrated in FIGS. 1 and 2. With further reference to FIG. 1 and the hook 30 it will be seen that the hook can be engaged over the wearer's trousers belt when transporting the device from place to place and when the hook is thus engaged with the belt it will be evident that all of the solution or liquid has been retrieved and is carried within the confines of the reservoir portion of the handle.

In practice the solution containing cup is skillfully and carefully lined up with each selected teat and the teat is dipped and immersed in the disinfecting solution. As the top is lowered from its elevated antisepticizing locale the teat is withdrawn and freed with the result that the teat coating solution gravitates in the then lowered cup. In fact, a drop or two usually adheres to the tip of the teat, dries and forms a protective seal. This seal is washed off prior to the next milking procedure.

As is true with any appliance in the field of endeavor under consideration and depending on the construction and design of the same practice and skill and keeping in mind the time and labor difficulties determines the exact steps which may be best pursued for reliably effective results. A more extended description of the construction and mode of use is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. As an article of manufacture, a manually applicable and removable teat disinfecting device for use after milking a cow, comprising a vertically elongated upwardly opening teat enclosing and dipping cup having a receptacle portion for receiving a teat, a median portion of one side wall of said cup having a dual purpose inlet and outlet opening that is vertically elongated with respect to the vertically elongated extent of the cup, and relatively narrow in its horizontal extent, a hollow horizontally elongated liquid containing and dispensing handle disposed at right angles to said cup and having a closed outer end and an open inner dispensing end integrally united with said one side wall and aligned and communicating with said receptacle portion by way of said opening, said handle having the additional function of a reservoir for (1) initially containing and storing a re-usable liquid when the device is not being used, (2) dispensing and pouring a predetermined amount of such liquid into the receptacle portion for teat dipping and antisepticizing needs and (3) retrieving such a re-usable liquid by way of said opening in readiness for subsequent teat dipping, the cross-sectional dimension of said handle being larger than the cross-sectional area of said opening, said cup being cylindrical in cross-section and the outside diameter of its upper end corresponding to the outside diameter of said handle, the depth of the receptacle portion being slightly greater than the outside diameter of said handle, the upper open end of said cup is provided with an inwardly and downwardly turned endless flange, said flange overhanging said open end and constituting both a spill-guard and a means to retain a soft absorbent sponge in the receptacle portion of the cup, the bottom of said cup is flat and the lengthwise bottom of said handle is in a plane coextensive with the plane of said flat bottom, said cup being further tapered from its open top to said flat bottom.

2. The structure as defined in claim 1 wherein said handle is provided with a belt engaging clip to enable the device to be accessibly stored when a person using the device is engaged in disengaging milking machine cups from the teats of a cow.

* * * * *